US006888958B1

(12) United States Patent
Sawa et al.

(10) Patent No.: US 6,888,958 B1
(45) Date of Patent: May 3, 2005

(54) METHOD AND APPARATUS FOR INSPECTING PATTERNS

(75) Inventors: Eiji Sawa, Yokohama (JP); Hiromu Inoue, Yokohama (JP); Satoshi Imi, Hiratsuka (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/538,398

(22) Filed: Mar. 29, 2000

(30) Foreign Application Priority Data

Mar. 30, 1999 (JP) .......................................... 11-089332
Sep. 16, 1999 (JP) .......................................... 11-261912

(51) Int. Cl.[7] ............................ G06K 9/00; G06K 9/62; G06K 9/36

(52) U.S. Cl. ....................... 382/144; 382/288; 382/209; 382/216

(58) Field of Search ................................ 382/141, 144, 382/145, 147, 149, 150, 209, 216, 299, 288; 356/237.3, 237.4, 237.5, 239.7, 239.9

(56) References Cited

U.S. PATENT DOCUMENTS 4,021,778 A * 5/1977 Ueda et al. ................ 382/203
4,308,523 A * 12/1981 Schapira ..................... 382/216
4,345,312 A * 8/1982 Yasuye et al. .............. 382/151
4,547,800 A * 10/1985 Masaki ........................ 348/95
4,567,610 A * 1/1986 McConnell ................. 382/170
4,641,350 A * 2/1987 Bunn ......................... 382/124
4,669,123 A * 5/1987 Kobayashi et al. ......... 382/144
4,853,968 A * 8/1989 Berkin ....................... 382/151
5,073,952 A * 12/1991 Watanabe ................... 382/152
5,185,812 A * 2/1993 Yamashita et al. .......... 382/145
5,226,093 A * 7/1993 Iwase ......................... 382/236
5,581,638 A * 12/1996 Givens et al. .............. 382/294
5,850,466 A * 12/1998 Schott ........................ 382/141
6,005,977 A * 12/1999 Tanimizu et al. ........... 382/216
6,040,911 A * 3/2000 Nozaki et al. .............. 356/394
6,087,673 A * 7/2000 Shishido et al. ....... 250/559.45
6,175,953 B1 * 1/2001 Scepanovic et al. .......... 716/21

OTHER PUBLICATIONS

TDB–AAA–NO: NN9106470, Improving Apparent Bandwidth of Refresh Displays, IBM Technical Diclosure Bulletin, Jun. 1991, US, vol. 34 issue 1, pp. 470–473.*

* cited by examiner

*Primary Examiner*—Leo Boudreau
*Assistant Examiner*—Shefali Patel
(74) *Attorney, Agent, or Firm*—Oblon, Spivak, McClelland, Maier & Neustadt, P.C.

(57) ABSTRACT

The difference data between the real patter data Sij, and a 5×5 window with a noticed pixel in the center and the design pattern data Rij obtained by the design pattern data of the window being shifted in a plurality of directions with respect to the design pattern data Rij is found by a shift direction operation section, and the design pattern data in the direction in which the total of the pixels is minimum is selected from the difference data by a selection section, the difference between the central pixels Sij, Qij of the selected design pattern data and the central pixels Sij, Qij of the windows of the real pattern data is found by a difference operation section, and the difference and a threshold are compared in a defect judgement section, and thereby the pattern inspection of the object is carried out.

5 Claims, 10 Drawing Sheets

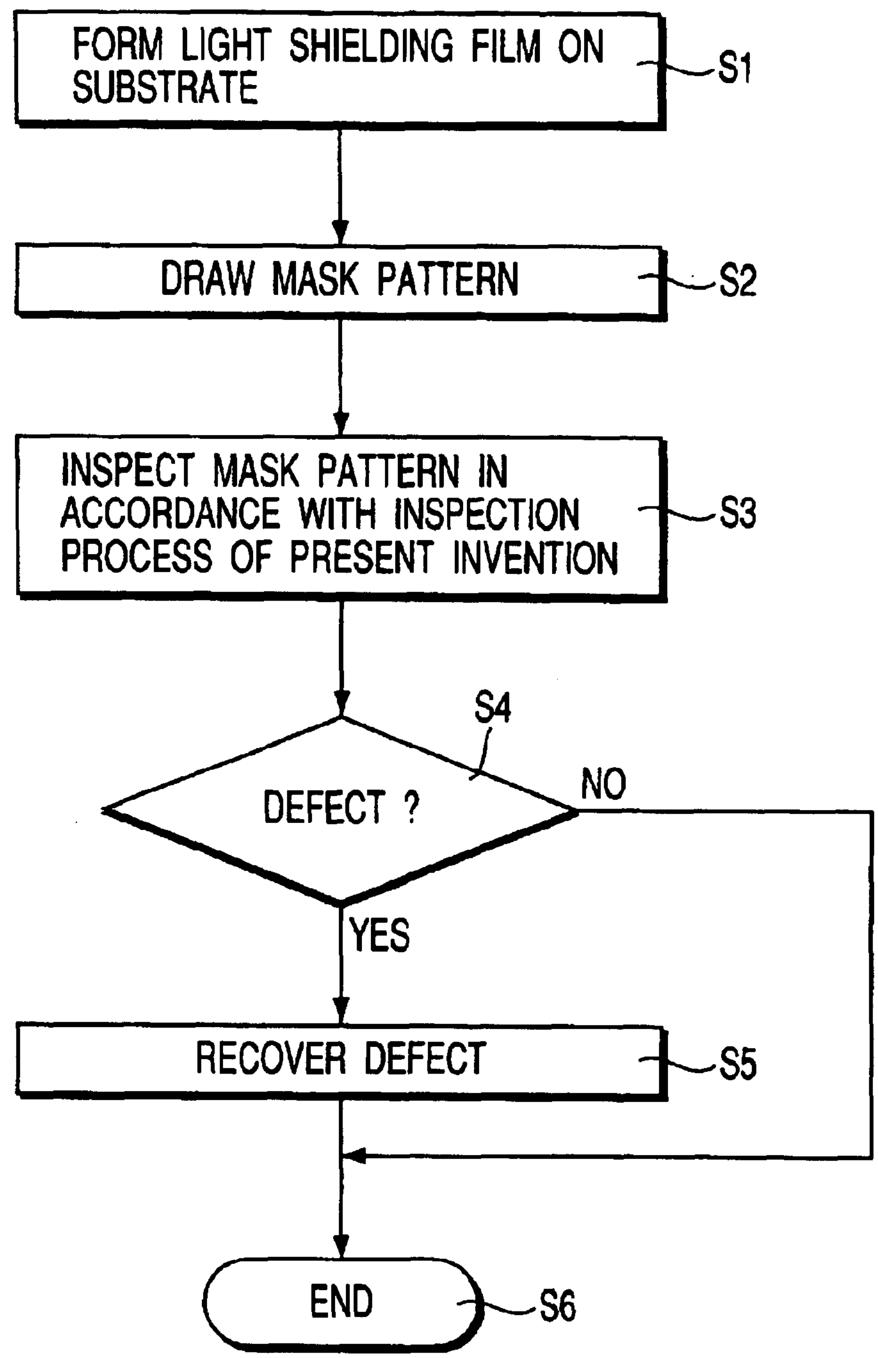
F I G. 8

METHOD AND APPARATUS FOR INSPECTING PATTERNS

CROSS-REFERENCE TO RELATED APPLICATIONS

This application is based upon and claims the benefit of priority from the prior Japanese Patent Applications No. 11-089332, filed Mar. 30, 1999; and No. 11-261912, filed Sep. 16, 1999, the entire contents of which are incorporated herein by reference.

BACKGROUND OF THE INVENTION

1. Field of the Invention

The present invention relates to a defect inspection of an object such as a mask or a reticle of a semiconductor wafer. More particularly, the invention relates to a method and apparatus for inspecting an auxiliary pattern (e.g., OPC: optical proximity correction pattern) formed on a mask or the like in order to enhance the resolution at the time of light exposure.

Further, the invention relates to a method and apparatus for inspecting a mask, a reticle, a semiconductor wafer, a semiconductor chip and a semiconductor circuit in which a pattern related to semiconductor production is formed, or a sample such as a printed substrate, a liquid crystal display substrate. More particularly, the invention relates to a method and apparatus for inspecting a pattern to find defects, therein, dust thereon and the like.

2. Discussion of the Background

In a step of manufacturing a semiconductor device, for example, an exposure apparatus performs exposure on the semiconductor substrate, by using a mask or a reticle. The circuit pattern transferred to the semiconductor substrate becomes smaller year by year. Due to the limited resolution of the exposure apparatus, the circuit pattern transferred to the substrate has rounded corners and edges as is illustrated in FIG. 1.

To perform exposure to provide on the substrate a pattern which is identical to the design pattern, an auxiliary pattern is now made in a mask or the like, as is shown in FIG. 2.

A mask having an auxiliary pattern is inspected. More specifically, the data representing the real pattern obtained by photographing the auxiliary pattern is compared with the data representing the design pattern, thereby to determine whether the pattern has defects or not.

Circuit patterns are made smaller and smaller as described above, and the resolution of the real pattern obtained by photographing of the circuit pattern is approaching the width of each element of the real pattern. In other words, the pattern precision is increasing. Thus, in a method in which differential is effected to detect the direction of a corner or an edge and real pattern data and design pattern data are compared, the position shift may occur between real pattern data and the design data. This inevitably lowers the accuracy of pattern inspection.

BRIEF SUMMARY OF THE INVENTION

Accordingly, the object of the present invention is to provide a method and apparatus which can inspect a pattern with high accuracy without a position shift between real pattern data and design data.

In order to attain the above object, according to a first aspect of the present invention, there is provided a pattern inspection method comprising acquiring difference data by subtracting a real pattern window having real pattern data corresponding to predetermined pixels of the real pattern data obtained by imaging an inspection object from a design pattern window corresponding to the real pattern window and shift design pattern windows which are obtained by shifting the design pattern windows in a plurality of directions, respectively; selecting one window from the design pattern window and shift design pattern windows such that the selected one window has a minimum difference data; and performing a pattern inspection of the inspection object based on a difference value between the selected one window and the real pattern window.

According to a second aspect of the invention, there is provided a pattern inspection method according to the first aspect, wherein the acquiring step, selecting step and performing step are repeatedly executed with respect to all pixels of the real pattern data.

According to a third aspect of the invention, there is provided a pattern inspection method according to the first aspect, wherein the plurality of directions are eight directions of 0°, 45°, 90°, 135°, 180°, 225°, 270°, 315° with respect to a noticed pixel of the real pattern window.

According to a fourth aspect of this invention, there is provided a pattern inspection method according to the first aspect, wherein the performing step comprises: selecting a central pixel of the selected one window obtaining a difference value between the selected central pixel and a central pixel of the window of the real pattern data, and determining a defect of the inspection object by comparing the obtained difference value between the selected central pixel of the selected one window and a threshold value set in advance.

According to a fifth aspect of the present invention, there is provided a pattern inspection method according to the first aspect, wherein a shift width of the shifted design pattern windows is within one pixel.

According to a sixth aspect of the invention, there is provided a pattern inspection method according to the first aspect, wherein the performing step comprises: obtaining a difference value by subtracting a noticed pixel of the selected one window and predetermined pixels surrounding the noticed pixel of the selected one window from a noticed pixel of the real pattern window and predetermined pixels surrounding the noticed pixel of the real pattern window, outputting 1) a "0" difference value in a case where the obtained difference value is within a difference value obtained by shifting the design pattern window by one pixel or less, 2) a difference value obtained by subtracting the minimum value from the obtained difference value in a case where the obtained difference value is less than a minimum value of difference values obtained by shifting the design pattern window and 3) a difference value obtained by subtracting a maximum value of difference values which are obtained by shifting the design pattern window by one pixel or less from the obtained difference value in a case where the obtained difference value is lager than the maximum value, and performing the pattern inspection of the inspection object by comparing the outputted difference value with a threshold value set in advance.

According to a seventh aspect of the invention, there is provided a pattern inspection method according to the first aspect, wherein the difference value is determined based on a lightness of pixels in the real pattern data and a lightness of pixels in the design pattern data.

According to an eighth aspect of this invention, there is provided a pattern inspection device comprising: means for acquiring difference data by subtracting a real pattern window having real pattern data corresponding to predetermined pixels of the real pattern data obtained by imaging an inspection object from a design pattern window corresponding to the real pattern window and shift design pattern windows which are obtained by shifting the design pattern windows in a plurality of directions, respectively; means for selecting one window from the design pattern window and shift design pattern windows such that the selected one window has a minimum difference data; and means for performing a pattern inspection of the inspection object based on a difference value between the selected one window and the real pattern window.

According to a ninth aspect of the invention, there is provided a pattern inspection device as above described wherein the acquisition of the difference data by the means for acquiring, selection of the selected on window by the means for selecting and pattern inspection performed by the means for performing are repeatedly executed with respect to all pixels of the real pattern data.

According to a tenth aspect of this invention, there is provided a pattern inspection device according to the eighth aspect, wherein the plurality of directions are eight directions of 0°, 45°, 90°, 135°, 180°, 225°, 270°, 315° with respect to a noticed pixel of the real pattern window.

According to an eleventh aspect of the present invention, there is provided a pattern inspection device according to the eighth aspect, wherein the performing step comprises: means for selecting a central pixel of the selected one window, obtaining a difference value between the selected central pixel and a central pixel of the window of the real pattern data, and determining a defect of the inspection object by comparing the obtained difference value between the selected central pixel of the selected one window and a threshold value set in advance.

According to a twelfth aspect of the invention, there is provided a pattern inspection device according to the eighth aspect, wherein a shift width of the shifted design pattern windows is within one pixel.

According to a thirteenth aspect of the invention, there is provided a pattern inspection device according to the eighth aspect, wherein the means for performing comprises obtaining a difference value by subtracting a noticed pixel of the selected one window and predetermined pixels surrounding the noticed pixel of the selected one window from a noticed pixel of the real pattern window and predetermined pixels surrounding the noticed pixel of the real pattern window, outputting 1) a "0" difference value in a case where the obtained difference value is within a difference value obtained by shifting the design pattern window by one pixel or less, 2) a difference value obtained by subtracting the minimum value from the obtained difference value in a case where the obtained difference value is less than a minimum value of difference values obtained by shifting the design pattern window and 3) a difference value obtained by subtracting a maximum value of difference values which are obtained by shifting the design pattern window by one pixel or less from the obtained difference value in a case where the obtained difference value is lager than the maximum value, and performing the pattern inspection of the inspection object by comparing the outputted difference value with a threshold value set in advance.

According to a fourteenth aspect of the present invention, there is provided a pattern inspection device according to the eighth aspect, wherein the difference value is determined based on a lightness of pixels in the real pattern data and a lightness of pixels in the design pattern data.

According to a 15th aspect of the present invention, there is provided a method of manufacturing a mask comprising: preparing a substrate with a light shielding film on which a mask pattern is formed; and inspecting the substrate with the light shielding film on which a mask pattern is formed, wherein the inspecting step comprises: acquiring difference data by subtracting a real pattern window having real pattern data corresponding to predetermined pixels of the real pattern data obtained by imaging the mask pattern from a design pattern window corresponding to the real pattern window and shift design pattern windows which are obtained by shifting the design pattern windows in a plurality of directions, respectively; selecting one window from the design pattern window and shift design pattern windows such that the selected one window has a minimum difference data; and performing a pattern inspection of the mask pattern based on a difference value between the selected one window and the real pattern window.

According to a 16th aspect of the present invention, there is provided a method according to the 15th aspect, wherein the acquiring step, selecting step and performing step are repeatedly executed with respect to all pixels of the real pattern data.

According to a 17th aspect of the present invention, there is provided a method according to the 15th aspect, wherein the plurality of directions are eight directions of 0°, 45°, 90°, 135°, 180°, 225°, 270°, 315° with respect to a noticed pixel of the real pattern window.

According to a 18th aspect of the present invention, there is provided a method according to the 15th aspect, wherein the performing step comprises: selecting a central pixel of the selected one window, obtaining a difference value between the selected central pixel and a central pixel of the window of the real pattern data, and determining a defect of the mask pattern by comparing the obtained difference value between the selected central pixel of the selected one window and a threshold value set in advance.

According to a 19th aspect of the present invention, there is provided a method according to the 15th aspect, wherein a shift width of the shifted design pattern windows is within one pixel.

According to a 20th aspect of the present invention, there is provided a method according to the first aspects, wherein the performing step comprises: obtaining a difference value by subtracting a noticed pixel of the selected one window and predetermined pixels surrounding the noticed pixel of the selected one window from a noticed pixel of the real pattern window and predetermined pixels surrounding the noticed pixel of the real pattern window, outputting 1) a "0" difference value in a case where the obtained difference value is within a difference value obtained by shifting the design pattern window by one pixel or less, 2) a difference value obtained by subtracting the minimum value from the obtained difference value in a case where the obtained difference value is less than a minimum value of difference values obtained by shifting the design pattern window and 3) a difference value obtained by subtracting a maximum value of difference values which are obtained by shifting the design pattern window by one pixel or less from the obtained difference value in a case where the obtained difference value is lager than the maximum value, and performing the pattern inspection of the mask pattern by comparing the outputted difference value with a threshold value set in advance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a flowchart for explaining a manufacturing process of the photo mask;

DETAILED DESCRIPTION OF THE INVENTION

Embodiments of the present invention will now be described with reference to the accompanying drawings.

[First Embodiment]

Figure 3:
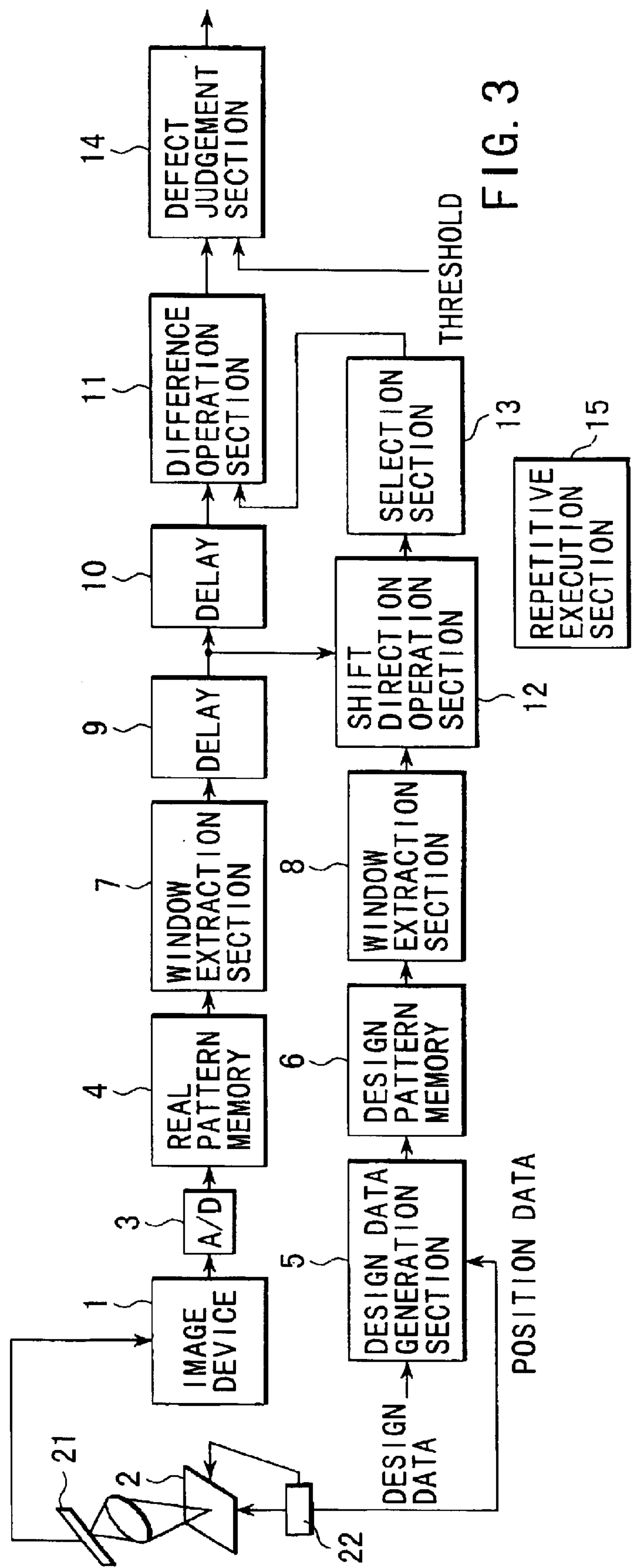
FIG. 3 is a block diagram showing a pattern-inspecting apparatus according to a first embodiment of the present invention.

FIG. 3 is a block diagram of a pattern-inspecting apparatus according to the first embodiment of the present invention.

An image device 1 is, for example, an area sensor 21 or the like. The image device 1 is designed to input an image of an object 2, such as a photo mask, and output an image signal representing the object 2. A real pattern memory 4 is connected to an A/D converter 3, which in turn is connected to the output terminal of the image device 1. The A/D converter 3 converts the image signal output from image device 1, to digital data, or real pattern data. The real pattern data is stored into the real pattern memory 4.

A design data generation section 5 is designed to develop the design data of the object 2 having an auxiliary pattern, into a bit pattern. The section 5 receives position data corresponding to an acquiring position of digital signal as an image signal which is output from area sensor 22. The section 5 then generates design pattern data representing a circuit pattern or the like that is formed in the object 2, by using the position data. The design pattern data thus prepared is stored into a design pattern memory 6. The design pattern memory 6 stores design pattern data which has been generated on the assumption that the real pattern is rounded at corners and edges when formed by exposure performed based on the design data.

To the real pattern memory 4 and design pattern memory 6, window extraction sections 7, 8 are connected respectively. To one window extraction section 7, a difference operation section 11 is connected via delay sections 9 and 10. To the other window extraction section 8, the difference operation section 11 is connected via a shift direction operation section 12 and a selection section 13.

The window extraction section 7 has the function of extracting the real pattern data of a window of 5×5 pixels (5×5 window, hereinafter) with a noticed pixel located in the center, for example, in order to accomplish a local inspection based on the real pattern data stored in the real pattern memory 4.

The delay section 9 delays the image data extracted by the window extraction section 7, by the time corresponding to the process time spent in the shift direction operation section 12. The next delay section 10 delays the image data supplied from the delay section 9, by the time corresponding to the process time spent in the selection section 13, and supplies the data to the difference operation section 11.

The window extraction section 8 has the function of extracting the design pattern data of a window of 7×7 pixels (7×7 window, hereinafter), for example. The section 8 supplies the data to the shift direction operation section 12 in order to effect a local inspection in accordance with the design pattern data stored in the design pattern memory 6.

The shift direction operation section 12 has the function of receiving the design pattern data of the 7×7 window extracted by the window extraction section 8. The section 12 also has the function of preparing, based on the design pattern and design pattern data of nine windows. The nine windows are: a basic 5×5 window with a noticed pixel in the center and eight 5×5 windows. The eight 5×5 windows are obtained by shifting the basic 5×5 window data by, for example, ½ pixel, in eight directions of 0°, 45°, 90°, 135°, 180°, 225°, 270°, 315°. The section has another function of obtaining the data representing the difference between the design pattern data and the real pattern data. The shift direction operation section 12 shifts the window by ½ pixel from the sum ratio of adjacent pixels when the window of the design pattern data is shifted in the eight directions of 0°, 45°, 90°, 135°, 180°, 225°, 270°, 315°.

The selection section 13 has the function of selecting the design pattern data in the direction in which the total of the pixels is minimum, that is, the total of the pixels is closest to 0 among the difference data found by the shift direction operation section 12. In other words, the section 13 selects the design pattern whose position has been corrected with respect to the real pattern data Sij, among the difference data found by the shift direction operation section 12.

The difference operation section 11 has the function of obtaining the difference between a central pixel of the window of the design pattern data selected by the selection section 13, and a central pixel of the window of the real pattern data from the delay section 10.

A defect judgement section 14 has the function of comparing the difference supplied from the difference operation section 11 with the threshold set in advance, thereby determining whether defects exist in the object 2.

A repetitive execution section 15 has the function of causing the shift direction operation section 12, selection section 13, difference operation section 11, and defect judgement section 14 to repeat the process of inspecting the pattern of the object 2, for all the pixels of the real pattern data.

Figure 4:
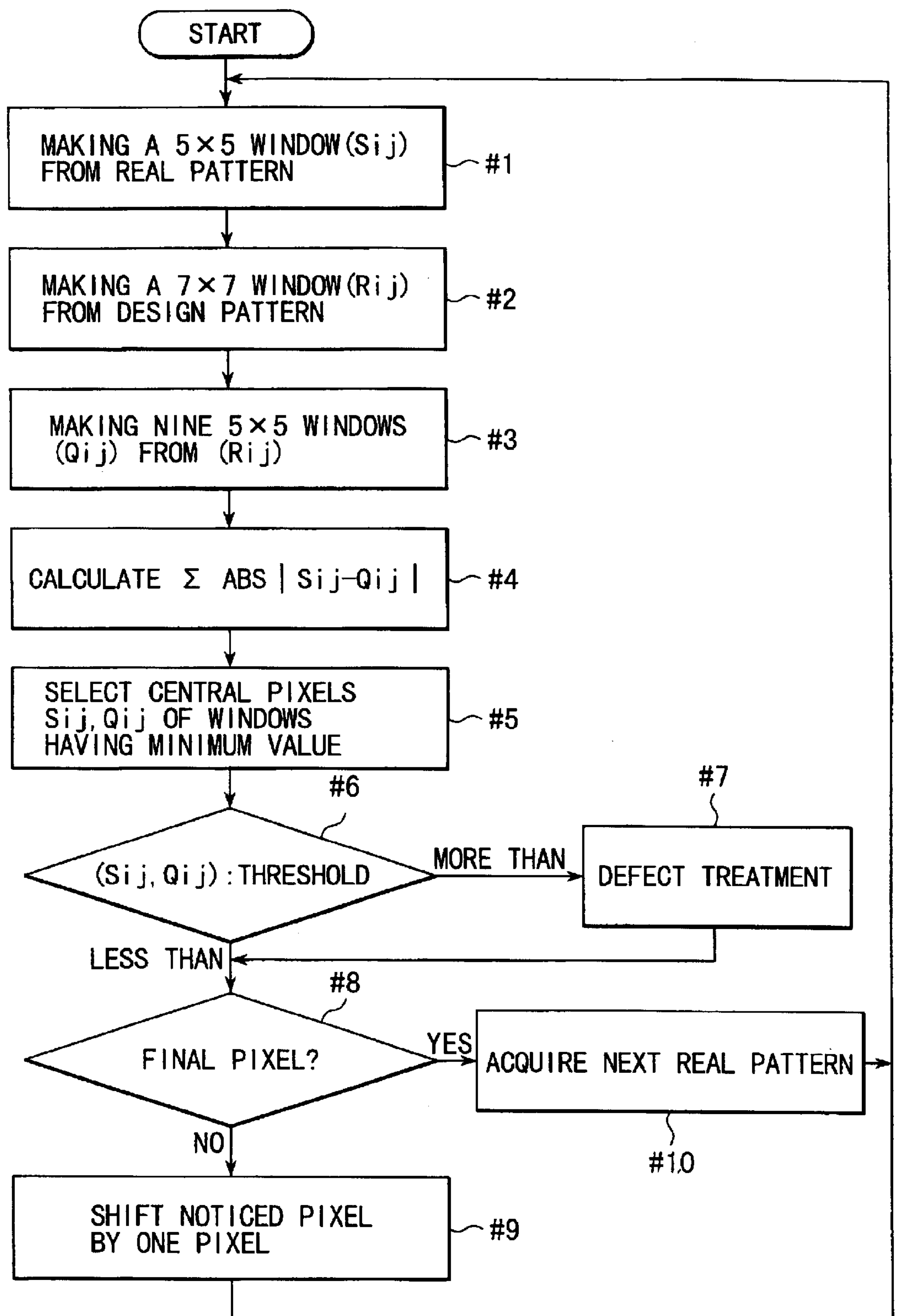
FIG. 4 represents an algorithm of correcting a position shift in the pattern-inspecting apparatus.

The operation of the apparatus so constructed as described above will be explained below, with reference to FIG. 4 that shows the algorithm for correcting the position shift.

The image device 1 inputs an image of the object 2 such as a photo mask, and outputs the image signal thereof. The A/D converter 3 converts the image signal to digital data, or real pattern data. The real pattern data is stored into the real pattern memory 4.

The design data generation section 5 develops the design data of the object 2, in which an auxiliary pattern is formed, into a bit pattern. The section 5 also inputs position data corresponding to a drawing position of the digital signal as the image signal the image device 1 has output. The section 5 prepares the design pattern data representing a circuit pattern or the like formed in the object 2, by using the position data. The design pattern data is stored into the design pattern memory 6.

Figure 5:
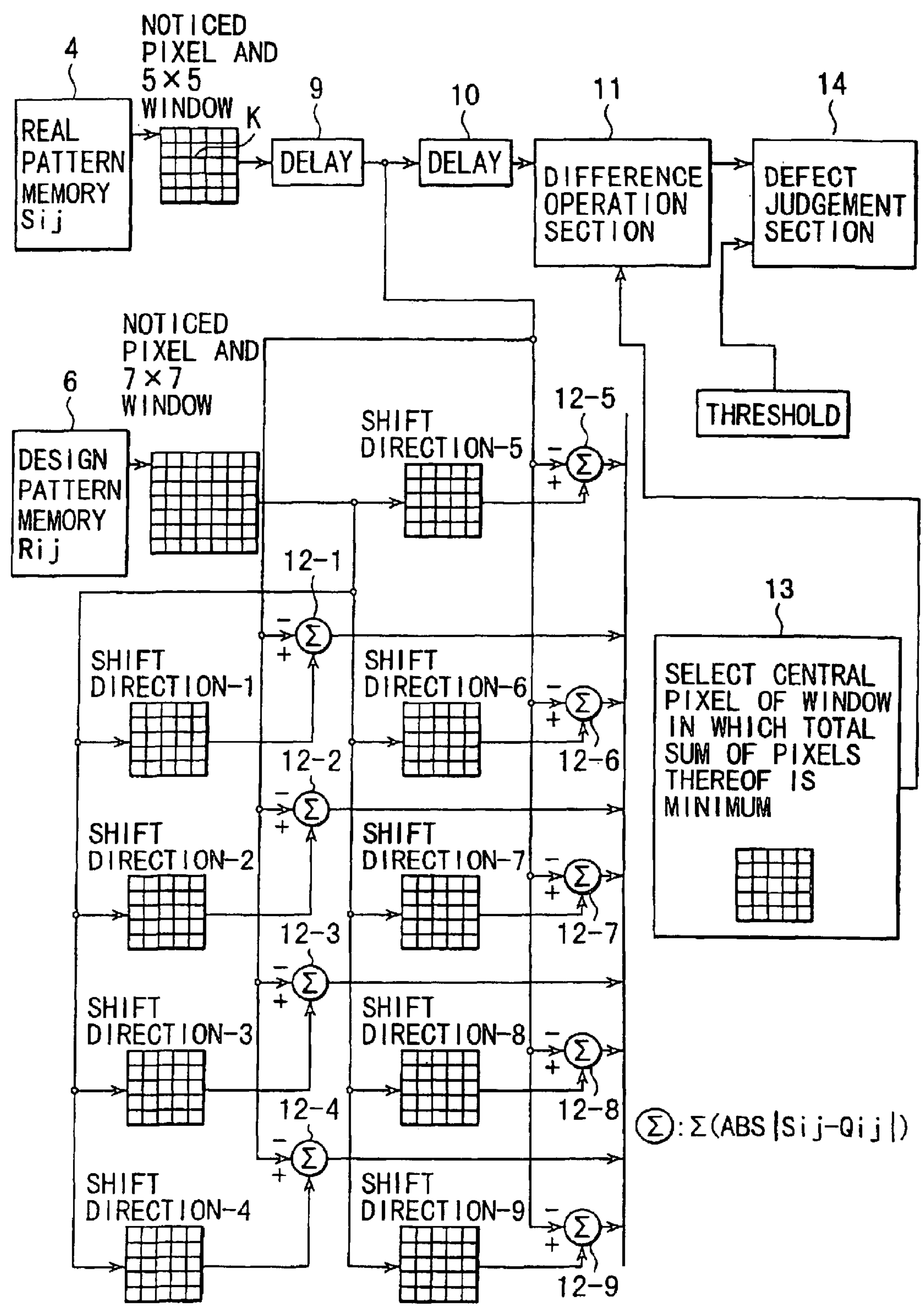
FIG. 5 is a flow chart illustrating how the apparatus perform various processes.

The flow of the inspection the pattern-inspecting apparatus will be described below, with reference to the schematic diagram of FIG. 5.

The real pattern data stored in the real pattern memory 4 is called Sij, while the design pattern data stored in the design pattern memory 6 is called Rij.

In the step #1, the window extraction section 7 extracts the real pattern data of a 5×5 window with a noticed pixel K located in the center, from the real pattern data Sij stored in the real pattern memory 4. The real pattern data of the 5×5 window extracted by the section 7 is delayed by the delay section 9, by the time corresponding to the process time spent in the shift direction operation section 12 described below. The real pattern data is then delayed by the time corresponding to the process time spent in the selection section 13, by the delay section 10. The real pattern data, thus delayed, is supplied to the difference operation section 11. Then, in the step #2, the other window extraction section 8 extracts the design pattern data of a 7×7 window from the design pattern data Rij stored in the design pattern memory 6. The design pattern data is supplied to the shift direction operation section 12.

In the step #3, the shift direction operation section 12 receives the design pattern data Rij of the 7×7 window extracted by the window extraction section 8. The section 12 prepares design pattern data Qij of the total of 9 windows from the design pattern data Rij. Of these nine windows, the first is a basic 5×5 window with a noticed pixel located in the center. The other eight windows have been obtained by shifting the design pattern data of the basic window by ½ pixel, in eight directions of 0°, 45°, 90°, 135°, 180°, 225°, 270°, 315°, respectively. The shift direction operation section 12 shifts the window by ½ pixel from the sum ratio of adjacent pixels when the window of the design pattern data is shifted in the eight directions of 0°, 45°, 90°, 135°, 180°, 225°, 270°, 315°.

Figure 6:
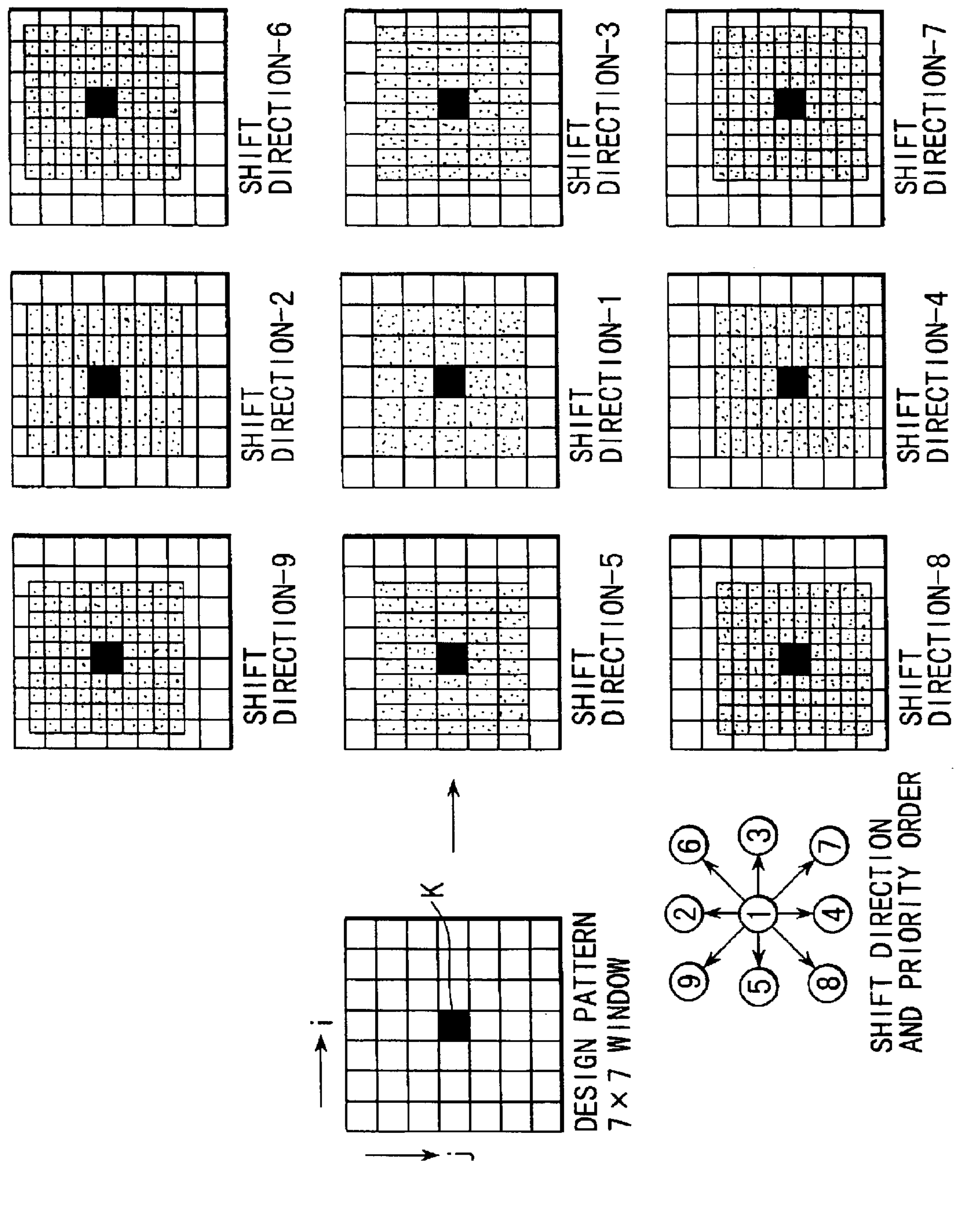
FIG. 6 is a schematic representation of design pattern data of a 5×5 window which has been shifted in a plurality of directions.

FIG. 6 schematically shows how the design pattern data of the above nine 5×5 windows is obtained. In FIG. 6, the design pattern data Qij of the 5×5 window with the noticed pixel K in the center is shown as shifted in the shift direction −1 from the design pattern data Rij. Similarly, the design pattern data of the 5×5 window obtained from the 5×5 window shifted by ½ pixel in the direction of the angle of 90° is shown as shifted in the shift direction −2. Likewise, the design pattern data Qij of the 5×5 window obtained from the 5×5 window shifted by ½ pixel in the direction of the angle of 0° is shown as shifted in the shift direction −3; the design pattern data Qij of the 5×5 window obtained from the 5×5 window shifted by ½ pixel in the direction of the angle of 270° is shown as shifted in the shift direction −4; the design pattern data Qij of the 5×5 window obtained from the 5×5 window shifted by ½ pixel in the direction of the angle of 180° is shown as shifted in the shift direction −5; the design pattern data Qij of the 5×5 window obtained from the 5×5 window shifted by ½ pixel in the direction of the angle of 45° is shown as shifted in the shift direction −6; the design pattern data Qij of the 5×5 window obtained from the 5×5 window shifted by ½ pixel in the direction of the angle of 315° is shown as shifted in the shift direction −7; the design pattern data Qij of the 5×5 window obtained from the 5×5 window shifted by ½ pixel in the direction of the angle of 225° is shown as the time of the shift direction −8; and the design pattern data Qij of the 5×5 window obtained from the 5×5 window shifted by ½ pixel in the direction of the angle of 135° is shown as shifted in the shift direction −9. The closer each window is to the center, the higher the priority order of its shift direction. The priority order of the 5×5 windows, each having a noticed pixel K located in the center, is: the direction of the angle of 90°, the direction of the angle of 0°, the direction of the angle of 270°, the direction of the angle of 180°, the direction of the angle of 45°, the direction of the angle of 315°, the direction of the angle of 225°and the direction of the angle of 135°.

The shift direction operation section 12 supplies the design pattern data Qij of the 5×5 windows of the shift directions −1 to −9, to the difference operators 12-1 to 12-9, which find the difference between the real pattern data Sij and the design pattern data Qij. The difference is given as:

$$\Sigma(ABS|Sij-Qij|)$$

In the step #5, the selection section 13 selects the central pixels Sij and Qij of the design pattern data in the direction in which the total of the pixels is minimum, that is, the total of the pixels is closest to 0, from the difference data found by the shift direction operation section 12.

The position of the central pixels Sij and Qij of the design pattern data selected as described above is corrected with respect to the real pattern data Sij. That is, the position of the design pattern data Rij is corrected, which has been prepared on the assumption that the circuit pattern is rounded at corners and edges at the time of exposure, with respect to a mechanical position shift and the real pattern data Sij. Accordingly, the real pattern data Sij and the design pattern data Rij are matched in position for the corners and edges of the circuit pattern.

The difference operation section 11 finds the difference between the central pixels Sij and Qij of the design pattern data selected by the selection section 13, and the difference between the central pixels Sij and Qij of the windows of the real pattern data from the delay section 10. The section 12 then supplies the differences to the defect judgement section 14.

In the step #6, the defect judgement section 14 compares the difference supplied from the difference operation section 11 with the threshold value set in advance. If the difference is greater than the threshold value, the defect section 14 determines that the pattern of the object 2 has a defect. The flow then goes to the step #7, in which a defect process is performed. If the difference supplied from the section 11 is smaller than the threshold value, the defect judgement section 14 determines that the pattern of the object 2 has no defects and is therefore a normal one.

Figure 7:
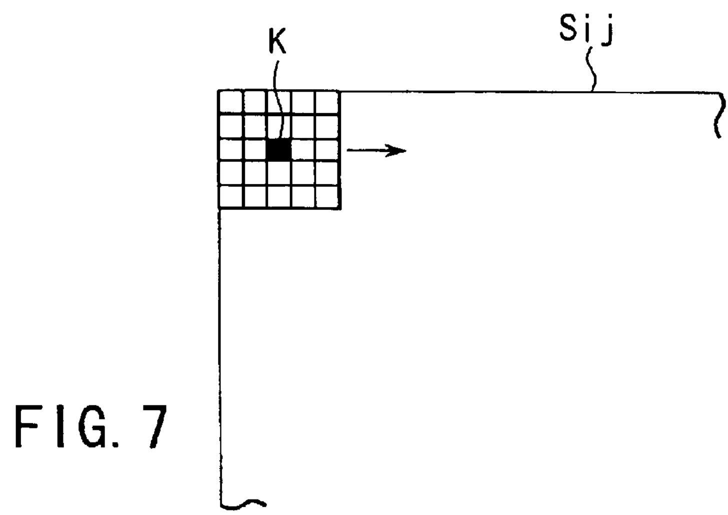
FIG. 7 is a diagram for explaining how the inspection is repeated, each time to inspect one of the pixels of real pattern data.

In the step #8, the repetitive execution section 15 determines whether the pattern inspection for all pixels of the real pattern data Sij has been completed or not. If the section 15 determines that the inspection has not been completed, the flow proceeds to the step #9 and shifts a noticed pixel K by one pixel a shown in FIG. 7. Then, the flow returns to the step #1, whereby the steps of inspecting the pattern of the object 2 are sequentially effected by the shift direction operation means 12, selection section 13, difference operation section 11 and defect judgement section 14, for all the pixels of the real pattern data.

If the pattern inspection is completed for all the pixels of the real pattern data Sij, the flow goes to the step #10. In step #10, the next object 2 is set, the real pattern data of the object 2 is stored into the real pattern memory 4, and the above-described pattern inspection is carried out.

In the first embodiment described above, the differences between the real pattern data Sij, on the one hand, and the basic design pattern data Rij of the 5×5 window, with a noticed pixel located in the center, obtained from the design pattern data Rij, and the 5×5 windows obtained from the basic window and shifted in a plurality of directions such as the eight directions of the angles of 0°, 45°, 90°, 135°, 180°, 225°, 270°, 315°, on the other hand, is found.

The design pattern data in the direction, in which the total of the pixels is minimum, is selected among the differences, in accordance with the differences between the central pixels Sij and Qij of the selected design pattern data, on the one hand, and central pixels Sij and Qij of the windows of the real pattern data the pattern inspection of the object 2, on the other hand. Therefore, it is possible to correct the position shift which may cause a pseudo-defect even in the OPC pattern close to the pixel resolving power. Hence, the pattern inspection can be accomplished with high accuracy without a position shift between the real pattern data and the design data. Moreover, it is possible to decrease the number of pseudo-defects resulting from a position shift, because the real pattern data is detected locally and sequentially using 5×5 windows.

As to the position shift between the design pattern data and the real pattern data, defects lower than the pixel resolving power can be detected. This is because the design pattern data is shifted in a plurality of directions by a ½ pixel, which is one pixel or less.

The present invention is not limited to the above embodiment. Rather, it can be modified as will be described as follows.

In the embodiment described above, the 7×7 windows are extracted from the design pattern data Rij to carry out the local inspection. Instead, the window size may be determined from the real pattern data Sij and the magnification of the optical system, and windows of 9×9 pixels or windows of 11×11 pixels may be used.

In the shift direction operation section 11, the windows are shifted in each direction by a ½ pixel. Alternatively, the windows may be shifted by one pixel or less, in accordance with the shift amount between the real pattern data Sij and the design pattern data Rij.

As has been described above in detail, this invention can provide a pattern-inspecting method and a pattern-inspecting apparatus, which effect inspect patterns with high accuracy without a position shift between the real pattern data and the design data.

Next, where a photo mask is used as the inspection object, the method for manufacturing the photo mask will be described.

FIG. 8 is a flowchart for explaining a manufacturing process of the photo mask.

In the manufacturing process of the photo mask, as shown in FIG. 8, a Cr light shielding film is formed on a substrate such as a silica glass by evaporation (S1).

And then, the mask pattern is formed by irradiating the Cr light shielding film formed on the substrate with an electron beam (S2). Next, the inspection of the mask pattern is performed in accordance with above described inspection process (S3), and it is determined whether or not the mask pattern has a defect (S4).

In step 4, if it is determined that the mask pattern has a defect, the defect is recovered (S5) and the process of manufacturing the mask pattern is terminated (S6). Furthermore, in step 4, if it is determined that the mask pattern has no defect, the process is terminated (S6).

<Second Embodiment>

In the first embodiment, the central pixel of the design pattern window is selected so that the total of the pixels may be minimum, and the difference between the selected central pixel and the central pixel of the real pattern window is found, and the difference and the threshold value are compared, thereby determining whether or not an object has defects.

In the second embodiment, the process is the same as in the first embodiment, before the design pattern window is selected so that the total of the pixels may be minimum. The second embodiment differs in the method of determining the presence or absence of defects in accordance with the difference between the selected design pattern window (non-defective pattern) and the real pattern window.

The pattern-inspecting apparatus according to the second embodiment will be described below.

Figure 9:
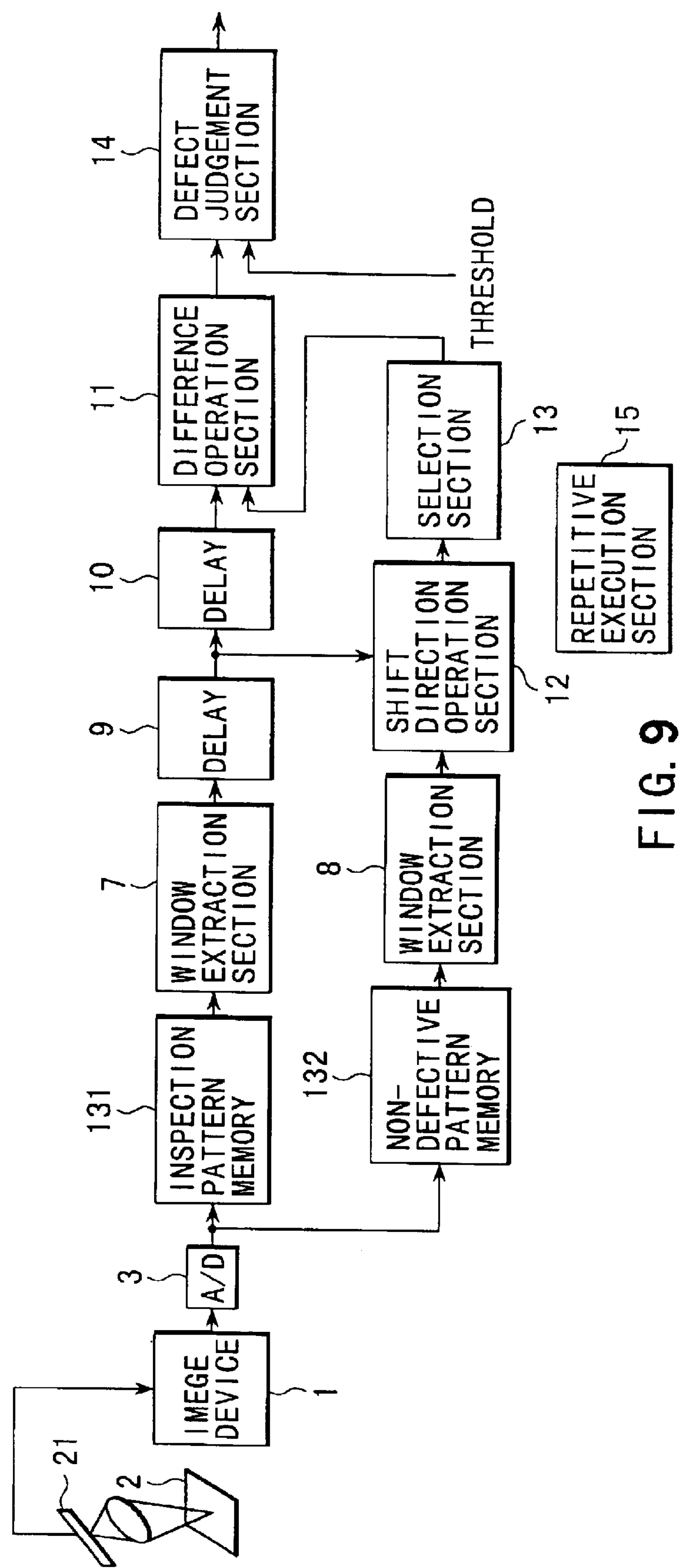
FIG. 9 is a block diagram of a pattern-inspecting device according to a second embodiment of the invention.

FIG. 9 is a block diagram of the pattern-inspecting apparatus according to the second embodiment of the present invention. The same sections as shown in FIG. 3 are designated at the same reference numerals.

The pattern-inspecting apparatus according to this embodiment differs from the first embodiment shown in FIG. 3 in that an inspection pattern memory 131 and a non-defective pattern memory 132 are used in place of the real pattern memory 4 and the design pattern memory 6, respectively.

As described above, the difference between this embodiment and the first embodiment resides in the difference operation method after a window is selected. The pattern-inspecting apparatus according to the second embodiment may have the structure shown in FIG. 3.

An image device 1, having a CCD area sensor 21 or the like, has the function of inputting an image of an object 2 such as a semiconductor chip formed on a semiconductor wafer, and outputting an image signal thereof.

To the output terminal of the image device 1, an inspection pattern memory 131 and a non-defective pattern memory 132 are connected by an A/D converter 3. When the image device 1 scans the object 2, it generates an image signal. The A/D converter 3 converts the image signal to digital inspection pattern data. The inspection pattern data is stored into the inspection pattern memory 131.

When the image device 1 scans a non-defective product made by using a non-defective semiconductor wafer selected in advance, it generates an image signal. The A/D converter 3 converts the image signal to digital data. The digital data is stored into the non-defective pattern memory 132 as non-defective pattern data.

To the inspection pattern memory 131 and the non-defective pattern memory 132, two window extraction sections 7 and 8 are connected respectively.

To one window extraction section 7, a difference operation section 11 is connected by delay sections 9 and 10. To the other window extraction section 8, a difference operation section 11 is connected through a shift direction operation section 12 and a selection section 13.

The window extraction section 7 has the function of extracting the inspection pattern data of a window of 5×5 pixels (5×5 window, hereinafter) with a noticed pixel in the center, for example, and supplying the data to the delay section 9 in order to carry out a local inspection of the inspection pattern data stored in the inspection plate memory 31

The delay section 9 delays the image data extracted by the window extraction section 7 by the time corresponding to the process time in the shift direction operation section 12, while the next delay section 10 has a function of delaying the image data from the delay section 9 by the time corresponding to the process time in the selection section 13, and supplying the data to the difference operation section 11.

The window extraction section 8 has the function of extracting the non-defective pattern data of a window of 7×7 pixels (7×7 window, hereinafter), for example, and supplying the data to the shift direction operation section 12 in order to carry out a local inspection based on the non-defective pattern data stored in the non-defective pattern memory 132.

The shift direction operation section 12 has the function of receiving the non-defective pattern data of the 7×7 window extracted by the window extraction section 8. Based on the non-defective pattern data, the section 12 prepares non-defective pattern data of a nine 5×5 window. More precisely, it prepares a basic pattern data of a noticed pixel located in the center and pattern data of eight 5×5 windows, obtained by shifting the basic non-defective pattern data in eight directions of 0°, 45°, 90°, 135°, 180°, 225°, 270°, 315°, for example, by a ½ pixel. The section 12 then finds the difference data between the non-defective pattern data and the inspection pattern data.

In this case, the shift direction operation section 12 shifts the window by a ½ pixel from the sum ratio of adjacent pixels when the window of the non-defective pattern data is shifted in the eight directions of 0°, 45°, 90°, 135°, 180°, 225°, 270°, 315°.

The selection section 13 has the function of selecting the non-defective pattern data in the direction in which the total of the pixels is minimum, that is, the total of the pixels is closest to 0 among the difference data found by the shift direction operation section 12. In other words, the non-defective pattern data the position of which is corrected with respect to the inspection pattern data, among the difference data found by the shift direction operation section 12.

The difference operation section 11 finds the maximum value and the minimum value in the position of a noticed pixel when the standard image is shifted from the noticed pixel of the standard image and the surrounding pixels thereof. If the difference between the noticed pixel of the inspection image and the noticed pixel of the standard image is in the range between the maximum value found and the minimum value found, the difference operation section 11 determines that the difference is a noise, and does not output the difference.

A defect judgement section 14 has the function of comparing the difference from the difference operation section 11 with the threshold set in advance, thereby determining whether or not the object 2 has defects.

A repetitive execution section 15 has the function of repetitively performing a series of treatments of inspecting the pattern of the object 2 by the shift direction operation section 12, selection section 13, difference operation section 11, and defect judgement section 14, with respect to all the pixels of the inspection pattern data.

The operation of the supplying so constituted is described below.

The image device 1 uses a non-defective semiconductor wafer as an object, and inputs the image of the object such as a circuit pattern formed in the semiconductor wafer and outputs the image signal thereof.

The image signal output by the apparatus 1 is converted by the A/D converter 3, to non-defective pattern data. This non-defective pattern data is stored into the non-defective pattern memory 132.

Then, a general semiconductor chip, an object 2, is inspected. That is, the image device 1 inputs the image of a circuit pattern formed in the object 2 and so on, and outputs the image signal thereof. The image signal output by the image device 1 is converted by the A/D converter 3, to digital inspection pattern data. The inspection pattern data is stored into the inspection pattern memory 131.

By the comparison of the inspection pattern data and the non-defective pattern data, the inspection of the object 2 is carried out.

Figure 10:
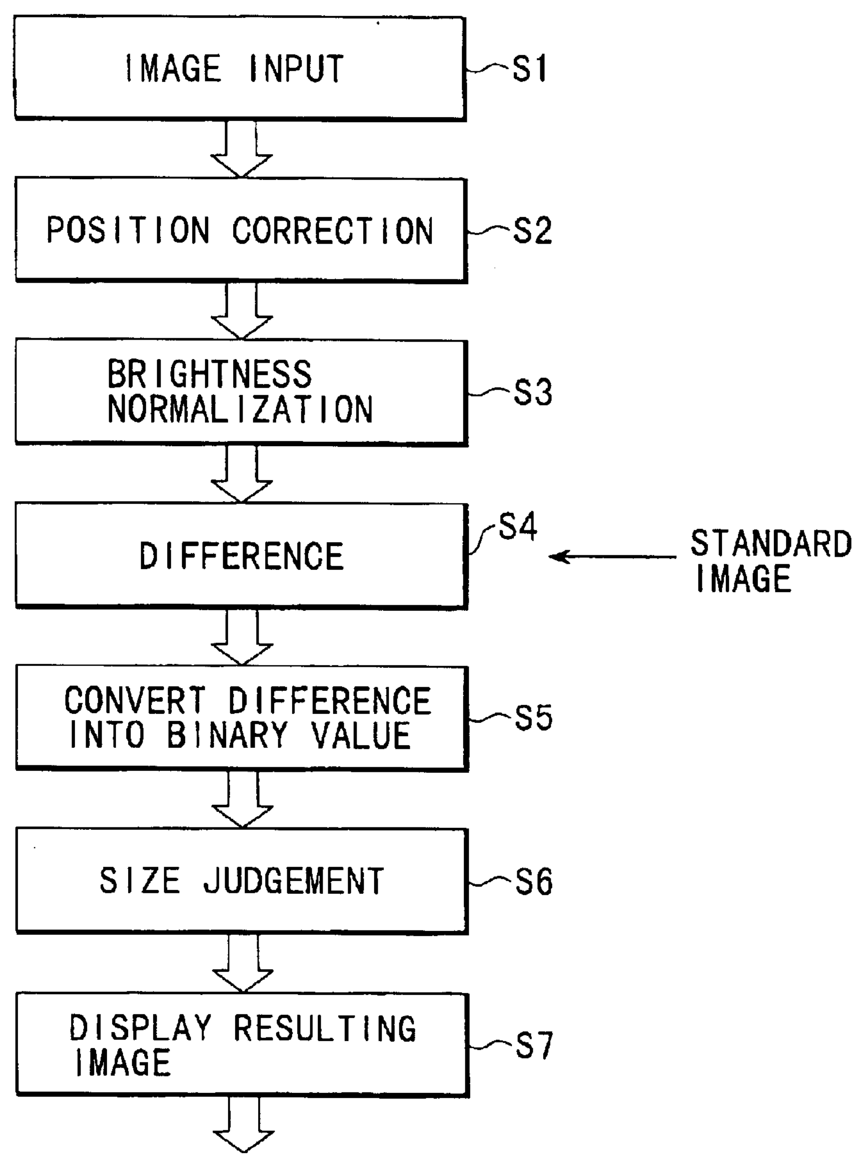
FIG. 10 is a flow chart showing the operation of the pattern-inspecting apparatus.

The operation of the pattern-inspecting apparatus will be described below, in accordance with the flow chart shown in FIG. 10. As described above, a non-defective semiconductor chip is used as the object 2. An object such as a circuit pattern formed in the semiconductor chip is scanned by the image device 1 in advance.

Then, the image scanned by the image device 1 is converted by the A/D converter 3, to non-defective pattern data. The non-defective pattern data is input to the non-defective pattern memory 132. Thus, the image signal is stored in the non-defective pattern memory 132 as non-defective pattern data. The image of the object 2 is scanned by the image device 1, and is converted by the A/D converter 3, to inspection image data. The inspection image data is input to the inspection pattern memory 131 as an inspection image (S1).

The position of the inspection pattern data input in the inspection pattern memory 131 is corrected with respect to the non-defective pattern data, which is the standard image stored in the non-defective pattern memory 132 (S2). Then, the brightness of the inspection pattern data is measured and is normalized (S3). The non-defective pattern data and the inspection pattern data of the standard image are compared and thereby the difference is detected (S4).

Figure 13:
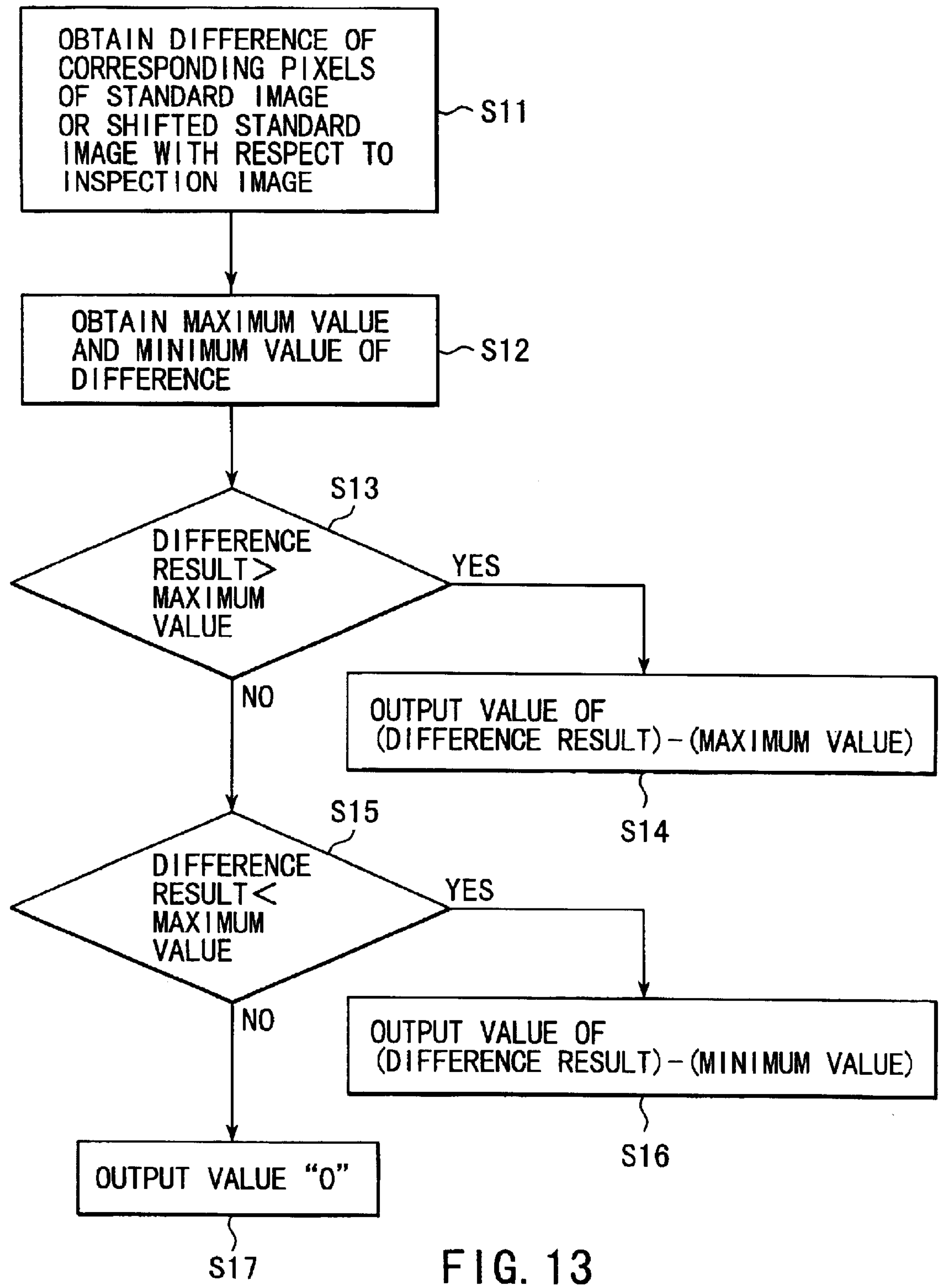
FIG. 13 is a flow chart explaining the process of obtaining the difference obtained by the pattern-inspecting apparatus according to a second embodiment of the present invention.

The difference detection is described with reference to FIG. 11A through FIG. 11E and a flow chart in FIG. 13, in the case of the one-dimensional data. The shift in this case is a ½ pixel.

Figure 11A:
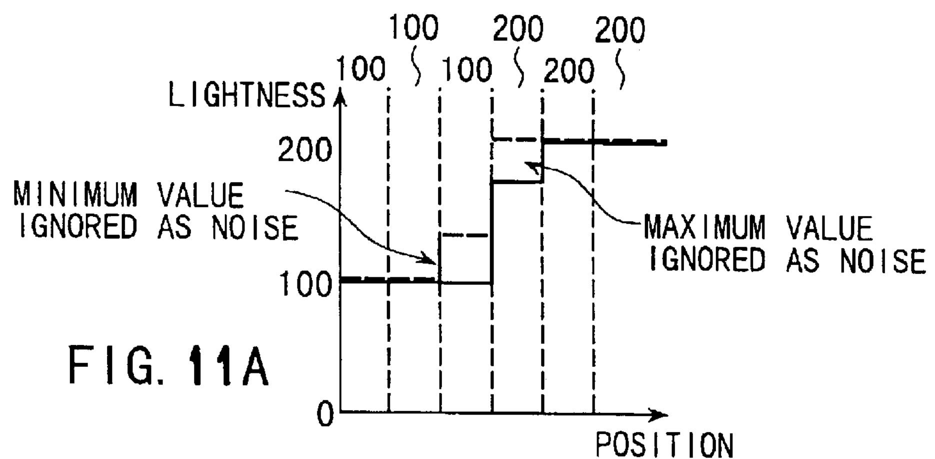
FIG. 11A is a diagram illustrating a standard image.
Figure 11B:
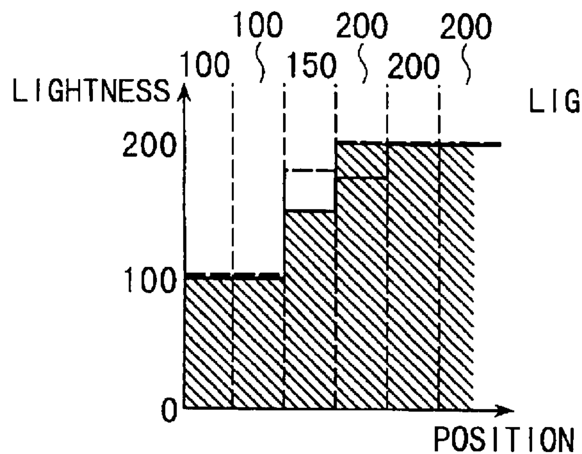
FIG. 11B is a diagram showing the standard image shifted to the left by ½ pixel.
Figure 11C:
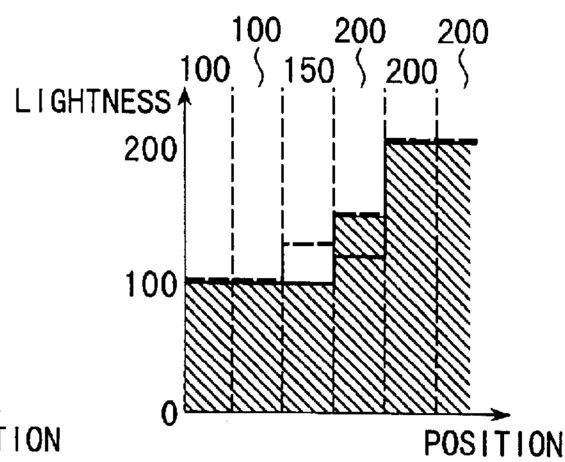
FIG. 11C is a diagram showing the standard image shifted to the right by ½ pixel.
Figure 11D:
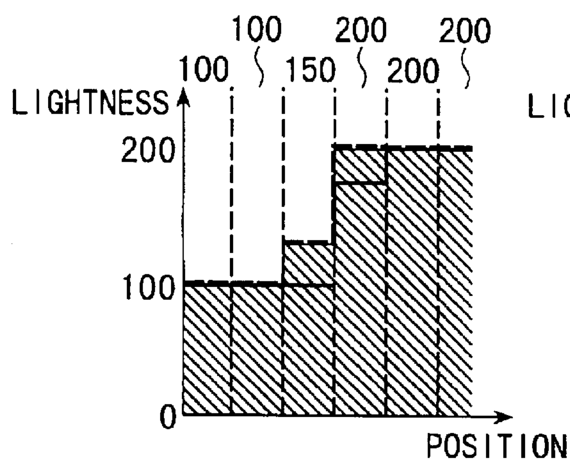
FIG. 11D is a diagram showing the standard image shifted to the left by ¼ pixel.
Figure 11E:
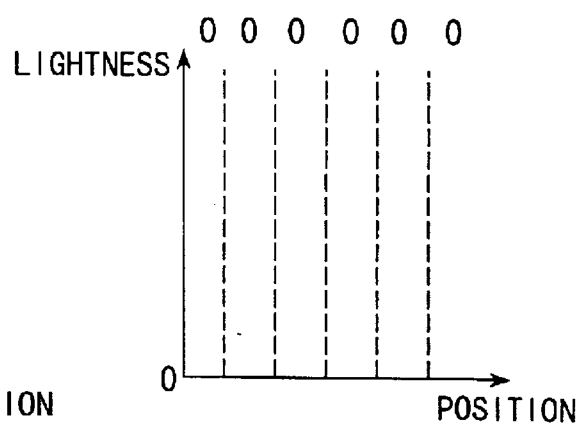
FIG. 11E is an image showing operation results.

FIG. 11A shows the standard image, FIG. 11B shows the standard image shifted in the left direction by a ½ pixel, FIG. 11C shows the standard image shifted in the right direction by a ½ pixel, FIG. 11D shows the inspection image shifted in the left direction by a ¼ pixel, and FIG. 11E shows the operation result.

Figure 1:
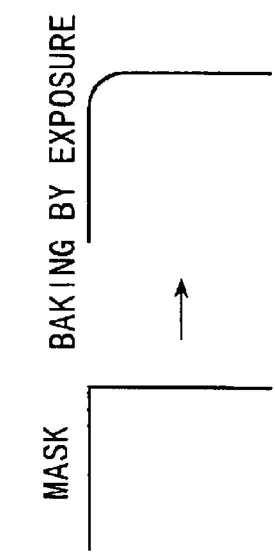
FIG. 1 is a diagram showing a corner or the like of a circuit pattern, which is rounded due to the limited resolution of an exposure apparatus.
Figure 2:
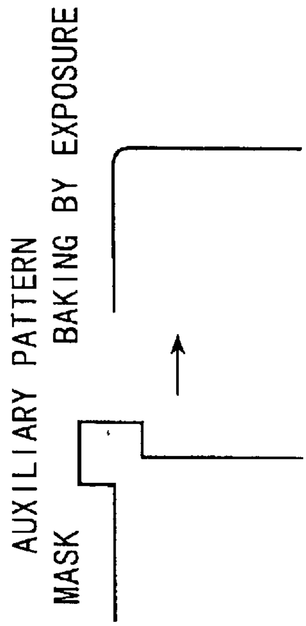
FIG. 2 is a diagram showing a corner or the like of a circuit pattern, which is formed in the case an auxiliary pattern is formed.

With respect to the standard image shown in FIG. 11A, and the standard images obtained by the standard image being shifted by a ½ pixel shown in FIG. 11B and FIG. 1C, the sum of the difference between the noticed pixel and the surrounding pixels of the inspection image, which is the inspection pattern data shown in FIG. 11D, and corresponding pixels with respect to the standard image and shifted standard image is calculated.

In the case of a window of 3×3 pixels, for example, for nine images, the difference between corresponding pixels is calculated, and the total is found. The difference between the corresponding pixels of the standard image or the shifted standard image when the images are closest to the noticed pixel and the surrounding pixels of the inspection image is found (S11). At the same time, the maximum value and the minimum value possible in the position of the noticed pixel when the standard image is shifted are found (S12), on the basis of the noticed pixel and the surrounding pixels of the standard image. Since the standard image is shifted by a ½ pixel, the maximum and minimum errors occur when the standard image is shifted by a ¼ pixel, half of ½.

If the difference from the inspection image is grater than the maximum value possible or smaller than the minimum value possible when the standard image is shifted, the value obtained by the maximum value or the minimum value being subtracted from the difference is output. Accordingly, when there is the closest correspondence, the resulting difference doe not have such a value as shown in FIG. 11E, with respect to the inspection image shown in FIG. 11D. That is, if the resulting difference is in the range between the maximum value and the minimum value, the difference is determined to be a noise, and no value is output (the difference "0" is output).

If the difference is greater than the maximum value, the value obtained by the maximum value subtracted from the difference (S14) is output. And if the difference is smaller than the maximum value, it is determined whether the difference is smaller than the minimum value or not (S15).

If the difference is smaller than the minimum value, the value obtained by the minimum value subtracted from the difference (S16) is output. And if the difference is smaller than the minimum value, value "0" is output (S17).

Then, the above difference is binarized in the binary system (S5), and the size is determined from the result in the binary system (S6), and the resulting image is displayed (S7).

When the process is completed with respect to one object 2, the repetitive execution section 15 performs the photographing of the next object 2. The same process is repeated, thereby inspecting the object 2. The non-defective pattern data need not be prepared each time by the scanning of the non-defective, but the non-defective pattern data stored in the non-defective pattern memory 132 may be used.

If in the method according to the present invention a two-dimensional image is used, the shift is a ½ pixel, a surrounding range is 3×3 pixels, and the primary interpolation is carried out between the pixels, the expression is as follows. The standard image is R(x, y), the inspection image is P(x, y), and the image of the operation result is Q(x, y).

$$R_{\min} = \operatorname*{Min}_{m=-1,0,1,n=-1,-,1}\left\{\frac{1}{4}(R(x+m,\ y+n)+3\cdot R(x,\ y))\right\} - R(x,\ y)$$

-continued $$R_{\max} = \operatorname*{Max}_{m=-1,0,1,n=-1,-,1}\left\{\frac{1}{4}(R(x+m,\ y+n)+3\cdot R(x,\ y))\right\} - R(x,\ y)$$

$$T(x,\ y) = P(x,\ y) - R(x+m,\ y+n);\ \text{when}$$

$$\operatorname*{Min}_{m=-\frac{1'}{2},0,\frac{1}{2},n=-\frac{1}{2},0,\frac{1}{2}}\left\{\sum_{s=-1}^{1}\sum_{t=-1}^{1}|P(x+s,\ y+t) - R(x+s+m,\ y+t+n)|\right\}$$

$$Q(x,\ y) = \begin{cases} \begin{cases} T(x,\ y) - R_{\min};\ \text{if}\ T(x,\ y) < R_{\min} \\ 0;\ \text{if}\ R_{\min} < T(x,\ y) < R_{\max};\ \text{if}\ (m = 0\ \text{and}\ n = 0) \\ T(x,\ y) - R_{\max};\ \text{if}\ R_{\max} < T(x,\ y) \end{cases} \\ \begin{cases} T(x,\ y) + R_{\max};\ \text{if}\ T(x,\ y) < -R_{\max} \\ 0;\ \text{if}\ -R_{\max} < T(x,\ y) < -R_{\min};\ \text{else} \\ T(x,\ y) + R_{\min};\ \text{if}\ -R_{\min} < T(x,\ y) \end{cases} \end{cases}$$

As was described above, the method according to the present invention is equivalent to determining the position delicately in the range of one pixel or less. Therefore, errors can be made smaller. As a result, defects with a small lightness difference can be extracted. Accordingly, in the method in prior art in which the maximum value–the minimum value in the surroundings is referred to, errors which may result from a position shift by one pixel or less were large. Defects with a small lightness difference could not be extracted, but the method according to the present invention can overcome the shortcomings.

In the method according to the present invention, simple and correct detection is possible irrespective of the way the standard image is given. This is because the maximum error possible is calculated based on one pixel. Thus, a large number of images treated in advance which the statistical method in prior art required is unnecessary.

In the method according to the present invention, defects can be extracted at the optimum threshold and even defects with a small lightness difference can be extracted irrespective of the standard image pattern, since the threshold varies at an edge and in a flat portion. In the local movement method according to prior art, if the threshold is set so that no noises may be produced where there is an edge, though few errors owing to the position shift occur in a flat portion, only defects with the lightness difference greater than the threshold are detected. Thus, the method according to the present invention can solve the problem.

Figure 12:
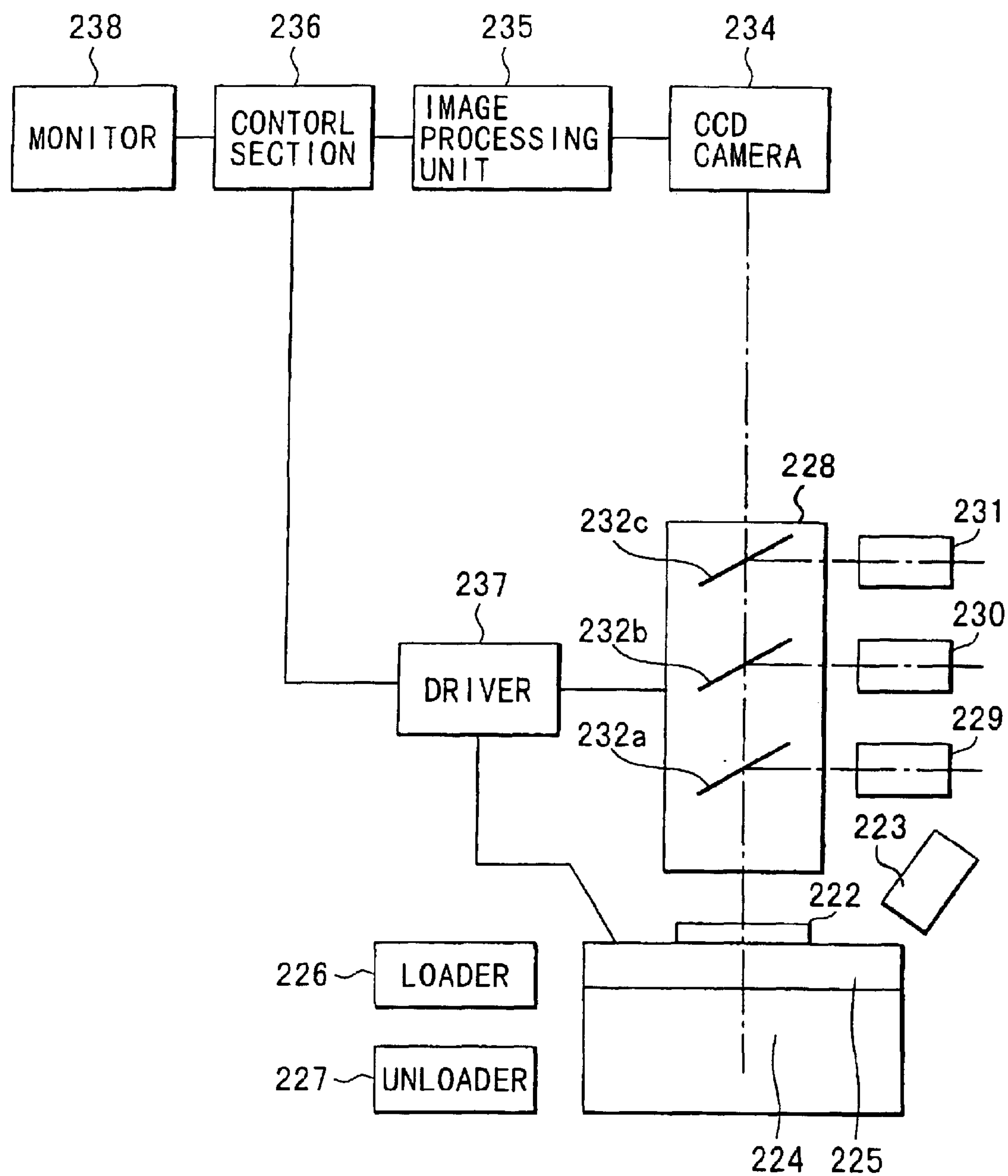
FIG. 12 is a block diagram showing an inspection apparatus.

The case, wherein the above inspection technique is used in a chip appearance inspection device, will be described. FIG. 12 is a block diagram showing an outline of a chip appearance inspection treatment.

An inspection table 223 on which an object 222 is put consists of an XY stage 224 and a θ stage 225 on the XY stage 224. With the inspection table 223, a loader 226 which carries a semiconductor wafer, which is the object 222, and an unloader 227 which delivers a semiconductor wafer are connected.

Above the inspection table 223 there is a Z stage 228, which has half mirrors 232*a*, 232*b*, 232*c* which lead a reflected light axis to a coaxial dark field illumination 229, an eyepiece 230, and an observation color camera 231 respectively. A ring lighting 233 is put where the ring lighting 233 can illuminate the surface of the inspection table 223.

On the light axis of the Z stage 228 and behind the axis there is a CCD camera 234 with high resolution. To the CCD camera 234, an image processing unit 235 is connected. The image processing unit 235 is connected with a control section 236. To the control section 236, a driver 237 and a monitor 238 are connected which control motors (not shown) which drive the XY stage 224, the θ stage 225 and the Z stage 228.

The device so constituted operates as follows: first, a semiconductor wafer, which is an object 222, is taken out of a magazine not shown and is carried by the loader 226, and put on the inspection table 223. As to the position shift of the semiconductor wafer on the inspection table 223, the rotation shift is corrected by the θ stage 225 and the center shift is corrected by the XY stage 224. And the fine alignment of the lens system is corrected by auto focus if necessary.

Then the specified illumination is lighted, and the inspection table 223 is moved to the first measurement position. Thereby part of an image of several chips or one chip is enlarged and drawn in the image processing unit 235. In the image processing unit 235 non-defective image data by a non-defective semiconductor wafer (not shown) is prepared in advance before the inspection using a learning pattern function. Since the data is stored, the data is used to determine the position of the image of the semiconductor wafer, which is the object 222. Then, the CCD camera 234 scans the image and the image processing unit 235, generating data. The data is compared with the non-defective image data. The quality of the object 222. The treatment in the image processing unit 235 is carried out using the above inspection method.

The same operation is repeated thereafter, and when all the measurement is completed, the semiconductor wafer on the inspection table 223 is delivered by the unloader 227, and is put in the magazine not shown.

Thus according to this device, it is possible in the inspection of a semiconductor chip to detect with certainty a defect with little noise and with a small lightness difference.

Although in the above embodiment the present invention is used in the semiconductor chip inspection device, the present invention can be applied not only in the semiconductor chip inspection device but also in a mask or reticle inspection device, or an inspection device of a print base or a liquid crystal base and so on.

According to the present invention, even in the case of an inspection image with a position shift of one pixel or less, it is possible to detect with certainty a defect with little noise and a small lightness difference.

Because the maximum error possible which the standard image can take is calculated based on one image, a simple and correct defect detection is possible irrespective of the way in which the standard image is given.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection method comprising:

comparing a real pattern window having real pattern data corresponding to predetermined pixels of the real pattern data obtained by imaging an inspection object to a design pattern window corresponding to the real pattern window and shifted design pattern windows which are obtained by shifting the design pattern windows in a plurality of directions, respectively, wherein a shift width of the shifted design pattern windows is within one pixel;

selecting one window from the design pattern window and shifted design pattern windows;

comparing a center pixel of the real pattern window to a center pixel of the selected design pattern window; and performing a pattern inspection of the inspection object, corresponding to the center pixel, according to a result of the comparison;

wherein the performing comprises:

obtaining a difference value by subtracting a noticed pixel of the selected one window and predetermined pixels surrounding the noticed pixel of the selected one window from a noticed pixel of the real pattern window and predetermined pixels surrounding the noticed pixel of the real pattern window, outputting 1) a "0" difference value in a case where the obtained difference value is within a difference value obtained by shifting the design pattern window by one pixel or less, 2) a difference value obtained by subtracting the minimum value from the obtained difference value in a case where the obtained difference value is less than a minimum value of difference values obtained by shifting the design pattern window and 3) a difference value obtained by subtracting a maximum value of difference values which are obtained by shifting the design pattern window by one pixel or less from the obtained difference value in a case where the obtained difference value is lager than the maximum value, and performing the pattern inspection of the inspection object by comparing the outputted difference value with a threshold value set in advance.

2. The pattern inspection method according to claim 1, wherein the difference value is determined based on a lightness of pixels in the real pattern data and a lightness of pixels in design pattern data of the selected design pattern window.

3. A pattern inspection device comprising:

means for comparing a real pattern window having real pattern data corresponding to predetermined pixels of the real pattern data obtained by imaging an inspection object to a design pattern window corresponding to the real pattern window and shifted design pattern windows which are obtained by shifting the design pattern windows in a plurality of directions, respectively, wherein a shift width of the shifted design pattern windows is within one pixel;

means for selecting one window from the design pattern window and shifted design pattern windows;

means for comparing a center pixel of the real pattern window to a center pixel of the selected design pattern window; and means for performing a pattern inspection of the inspection object, corresponding to the center pixel, according to a result of the comparison;

wherein the means for performing comprises obtaining a difference value by subtracting a noticed pixel of the selected one window and predetermined pixels surrounding the noticed pixel of the selected one window from a noticed pixel of the real pattern window and predetermined pixels surrounding the noticed pixel of the real pattern window, outputting 1) a "0" difference value in a case where the obtained difference value is within a difference value obtained by shifting the design pattern window by one pixel or less, 2) a difference value obtained by subtracting the minimum value from the obtained difference value in a case where the obtained difference value is less than a minimum value of difference values obtained by shifting the design pattern window and 3) a difference value obtained by subtracting a maximum value of difference values which are obtained by shifting the design pattern window by one pixel or less from the obtained difference value in a case where the obtained difference value is lager than the maximum value, and performing the pattern inspection of the inspection object by comparing the outputted difference value with a threshold value set in advance.

4. The pattern inspection device according to claim 3, wherein the difference value is determined based on a lightness of pixels in the real pattern data and a lightness of pixels in design pattern data of the selected design pattern window.

5. A method of manufacturing a mask comprising:

preparing a substrate with a light shielding film on which a mask pattern is formed; and inspecting the substrate with the light shielding film on which a mask pattern is formed, wherein the inspecting comprises:

comparing a real pattern window having real pattern data corresponding to predetermined pixels of the real pattern data obtained by imaging the mask pattern to a design pattern window corresponding to the real pattern window and shifted design pattern windows which are obtained by shifting the design pattern windows in a plurality of directions respectively, wherein a shift width of the shifted design pattern windows is within one pixel;

selecting one window from the design pattern window and shifted design pattern windows;

comparing a center pixel of the real pattern window to a center pixel of the selected design pattern window; and performing a pattern inspection of the mask pattern corresponding to the center pixel according to a result of the comparison;

wherein the performing comprises:

obtaining a difference value by subtracting a noticed pixel of the selected one window and predetermined pixels surrounding the noticed pixel of the selected one window from a noticed pixel of the real pattern window and predetermined pixels surrounding the noticed pixel of the real pattern window, outputting 1) a "0" difference value in a case where the obtained difference value is within a difference value obtained by shifting the design pattern window by one pixel or less, 2) a difference value obtained by subtracting the minimum value from the obtained difference value in a case where the obtained difference value is less than a minimum value of difference values obtained by shifting the design pattern window and 3) a difference value obtained by subtracting a maximum value of difference values which are obtained by shifting the design pattern window by one pixel or less from the obtained difference value in a case where the obtained difference value is larger than the maximum value, and performing the pattern inspection of the mask pattern by comparing the outputted difference value with a threshold value set in advance.

* * * * *